(12) United States Patent
Worth (10) Patent No.: US 6,257,200 B1
(45) Date of Patent: Jul. 10, 2001

(54) ENGINE CONTROL STRATEGY (75) Inventor: David Richard Worth, Shenton Park (AU)

(73) Assignee: Orbital Engine Company (Australia) Pty Limited, Balcatta (AU)

( * ) Notice: Subject to any disclaimer, the term of this patent is extended or adjusted under 35 U.S.C. 154(b) by 0 days.

(21) Appl. No.: 08/981,498

(22) PCT Filed: Sep. 25, 1996

(86) PCT No.: PCT/AU96/00610

§ 371 Date: Jan. 9, 1998

§ 102(e) Date: Jan. 9, 1998

(87) PCT Pub. No.: WO97/12138

PCT Pub. Date: Apr. 3, 1997

(30) Foreign Application Priority Data

Sep. 25, 1995 (AU) .................................. PN 5610

(51) Int. Cl.$^7$ ....................................... F02B 5/00
(52) U.S. Cl. .................. 123/305; 123/73 C; 123/295; 123/305; 123/478; 123/486; 123/531; 123/533
(58) Field of Search ................ 123/73 C, 295, 123/305, 478, 486, 531, 533

(56) References Cited

U.S. PATENT DOCUMENTS

| | | | |
|---|---|---|---|
| 3,908,624 | * 9/1975 | Miyake et al. | 123/262 |
| 4,480,620 | * 11/1984 | Tange et al. | 123/478 |
| 4,495,924 | * 1/1985 | Ueno et al. | 123/478 |
| 4,643,155 | * 2/1987 | O'Neill | 123/496 X |
| 4,658,792 | * 4/1987 | Yamashita et al. | 123/478 |
| 4,800,862 | * 1/1989 | McKay et al. | 123/531 |
| 4,887,216 | * 12/1989 | Ohnari et al. | 123/487 X |
| 5,016,598 | * 5/1991 | Kushibe et al. | 123/533 |
| 5,020,504 | * 6/1991 | Morikawa | 123/305 X |
| 5,078,107 | * 1/1992 | Morikawa | 123/295 |
| 5,085,193 | * 2/1992 | Morikawa | 123/73 C X |
| 5,086,737 | * 2/1992 | Watanabe et al. | 123/295 |
| 5,127,378 | * 7/1992 | Ito | 123/305 X |
| 5,156,125 | 10/1992 | Fukui et al. | 123/406.62 |
| 5,199,394 | 4/1993 | Hartmann et al. | 123/179.1 |
| 5,205,254 | * 4/1993 | Ito et al. | 123/531 X |
| 5,333,583 | * 8/1994 | Matsuura | 123/295 |
| 5,427,069 | * 6/1995 | Tomisawa et al. | 123/478 |

FOREIGN PATENT DOCUMENTS

| | | | |
|---|---|---|---|
| 2522586 | * 12/1976 | (DE) | 123/263 |
| 0 435 183 A2 | 7/1991 | (EP) . | |
| 2 163 816 | 3/1986 | (GB) . | |
| 2 222 435 | 3/1990 | (GB) . | |
| 2 257 790 | 1/1993 | (GB) . | |

OTHER PUBLICATIONS

Patent Abstracts of Japan, M 1288, p. 52, abstract of JP 4–109054 A, Apr. 1992.
Patent Abstracts of Japan, M701, p. 8, abstract of JP 62–288348 A, Dec. 1987.

* cited by examiner

Primary Examiner—Tony M. Argenbright
(74) Attorney, Agent, or Firm—Arent Fox Kintner Plotkin & Kahn, PLLC (57) ABSTRACT

In introducing fuel to a combustion chamber, the end of air (EOA) is established in the crank angle domain. For example, determination of the average or raw speed is utilize to determined an appropriate crank angle for the closing of the delivery injector (EOA). Once the end of air (EOA) is established in the crank angle domain, the start of air (SOA) may be set in the time domain (by a processor) at a time prior end of air (EOA) by duration equal to the time which the delivery is required to remain open. The required pulse width for the fuel metering injector and the desired fuel-air delay time may then be subtracted from the start of air (SOA) to obtain the start of fuel (SOF) and end of fuel (EOF) in the time domain. Other ways may be utilized to calculate SOA, SOF and EOF. For example, SOA may be estabished in the crank angle domain.

198 Claims, 3 Drawing Sheets

ENGINE CONTROL STRATEGY

The present invention relates to an engine control strategy and, in particular, to a method for controlling the occurrence of certain events in the operation of an engine.

The applicant's U.S. Pat. No. 4,693,224 discloses a method of dual fluid direct injection into the combustion chamber of an internal combustion engine. The method typically involves delivery of a metered quantity of fuel to each combustion chamber of an engine by way of a compressed gas, generally air, which entrains the fuel and delivers it from a delivery injector nozzle.

Typically, a separate fuel metering injector, as shown for example in the applicant's U.S. Pat. No. 4,934,329, delivers, or begins to deliver, a metered quantity of fuel into a holding chamber within, or associated with, the delivery injector prior to the opening of the delivery injector to enable direct communication with a combustion chamber. When the delivery injector opens, the pressurised gas, or in a typical embodiment, air, flows through the holding chamber to deliver the fuel previously metered thereinto to the engine combustion chamber. The utilisation of a holding chamber enables the metering of fuel for delivery and the actual delivery thereof to the combustion chamber to be separated into two distinct events.

In an engine operated in accordance with such a direct fuel injection strategy, a number of controlled events occur including start of fuel (SOF), end of fuel (EOF), start of air (SOA), end of air (EOA) and ignition.

Start of fuel (SOF) is the time at which the fuel injector or a fuel metering means begins metering fuel into the holding chamber and generally relates to the opening time of the fuel metering means or fuel injector.

End of fuel (EOF) is the time at which the fuel injector or a fuel metering means ceases metering fuel into the holding chamber and generally relates to the closing time of the fuel metering means or fuel injector.

Start of air (SOA) is the time at which the delivery means or injector, referred to above, begins delivery of the fuel entrained in the gas into the combustion chamber of the engine and generally relates to the opening time of the delivery means or injector.

End of air (EOA) is the time at which the delivery means or injector ceases delivery of the fuel entrained in the gas into the combustion chamber of the engine and generally relates to the closing time of the delivery means or injector.

Together, SOF and EOF define the duration for which the fuel metering injector is opened, SOA and EOA define the duration for which the delivery injector is opened and EOF and SOA define a fuel air delay (FAD) period, this being the period between the end of the fuel metering event and the commencement of the delivery of the fuel entrained in the gas.

These events may occur in this sequence, although ignition may occur just prior to EOA. Other variations in the order of these events are possible depending upon certain engine operating requirements or strategies. For example, SOA may occur at various times prior to EOF in order to provide certain desired fuel fluxing conditions. An example of this is shown in the applicant's U.S. Pat. No. 4,800,862, the contents of which are hereby incorporated by reference.

The relationship between ignition and EOA is typically of significant importance to the operation of the engine and generally ignition occurs in close time proximity to EOA, especially under idle conditions. Due to the fact that, to obtain combustion within the engine combustion chambers, an ignitable fuel-air mixture is required at or around the spark plug, a disruption to the desired relationship between the occurrence of EOA and ignition for a particular engine may result in combustion instability or stalling, especially under low or idle speed conditions. This is also true for certain single fluid injection systems wherein a desired relationship exists between the occurrence of the end of fuel injection and the timing of ignition.

Similar comments apply to other dual fluid injection systems which do not necessarily have a separate fuel metering injector and hence a SOF and EOF event. In particular, the applicant has developed and applied for patents for certain simplified fuel injection systems wherein a positive displacement fuel metering pump is used to meter discrete quantities of fuel for subsequent delivery directly into a combustion chamber of an engine by an air or delivery injector in a similar manner to that described hereinbefore. Such an injection system is disclosed in published applicant's Australian Patent Application No. 65608/94, the contents of which are hereby incorporated by reference. The relationship between the occurrence of the EOA and ignition is equally of significant importance in such systems.

In previous practice, the SOA position has typically been identified with reference to a particular angle of rotation of the crankshaft whilst the EOA has been calculated therefrom upon consideration of a desired duration for the delivery event. That is, SOA has typically been calculated or set in the crank domain whilst EOA has been calculated or set in the time domain. Typically, EOA is determined to occur at a particular time after SOA, as established in the crank domain, by adding time increments corresponding to the known required time delay for which the air or delivery injector is to be held open and the pulse width of a fuel/air delivery event. The pulse width is typically a function of engine operating conditions, notably including engine speed, and is set by an engine management system.

Thus, the above sequence of events is calculated from one point (SOA) and assumes an average engine speed notwithstanding that engine operating conditions may, and often do, vary subsequent to a given point.

As an example, SOA may occur at a crank angle of 40° BTDC. The calculated time increment for the air or delivery injector opening time as determined by an ECU of an engine management system of the engine may amount to say 3.32 ms and this time increment is established at an engine speed of 600 rpm which is assumed to remain constant when scheduling the EOA and ignition events. The ignition timing is established in the crank domain.

However, the engine speed may change, for example falling from say 600 rpm to 500 rpm due to, for example, the application of a load to the engine such as from a gear change occurring from idle following scheduling of the events for the next combustion event. In particular regard to this example, on engaging gear, the engine speed may drop as much as 100 rpm within 1–2 firing events. This is particularly so in marine engines which typically have a low rotational inertia and can drop around 100–200 rpm when put into gear from idle. The inertia of such engines is generally small compared to a vehicle engine, however the instantaneous load which is applied to the engine by going into gear is relatively large. This will typically cause an error in the occurrence of the EOA in the sequence of events. For example, at 600 rpm, EOA during idle operation should occur at around 28° BTDC. A 100 rpm drop in engine speed post-scheduling may result in EOA being positioned at around 30° BTDC (a 2° advance in the timing) due to the fixed delivery duration. This error, bearing in mind that the relationship between EOA and ignition is typically most important to provide satisfactory combustion stability at idle and low load, may cause less efficient operation of the engine.

The impact of a fall in engine speed on the calculated fuel/air delay (FAD) may also be detrimental to engine operation. As SOF, in the case where the system includes a fuel metering injector, is calculated from the average engine speed and this speed may drop, the FAD becomes variable. This is likely to affect the fuel fluxing, as measured by the air/fuel ratio profile during the air/fuel delivery event. For example, it may be desired to introduce a majority of the fuel to the combustion chamber early in the delivery event and an error in the FAD may alter this. In particular, it is likely at idle that a reduced FAD will contribute to the existence of a rich mixture at EOA and the opposite for an increased FAD.

Accordingly, it is the object of the present invention to provide, for a fuel injection system, a method of controlling an engine in which scheduling of events for an engine operating cycle maintains a desired relationship between the end of the fuel delivery event or, in the case of a dual fluid injection system, EOA, and ignition that is conducive to efficient operation of the engine.

With this object in view, the present invention provides a method of controlling the introduction of fuel to a combustion chamber of an internal combustion engine by an injection system comprising a delivery means wherein, at least under certain engine operating conditions, the end of the duration of opening of the delivery means and the timing of ignition are established by an engine control means to be at a respective crank angle.

Preferably, the delivery means is a direct injection delivery injector.

According to a different embodiment, the present invention provides a method of controlling the introduction of a fuel/gas mixture to a combustion chamber of an internal combustion engine by an injection means comprising a delivery injector wherein, under certain engine operating conditions, the end of the duration of opening of the delivery injector is established by an engine control means to be at a particular crank angle.

Preferably, fuel is metered to said delivery injector by a fuel metering means which may take the form of a fuel metering injector. However, other fuel metering devices such as pumps, especially positive displacement pumps, may be employed instead.

Conveniently, the delivery injector may take the form of a gas injector, for example, an air injector communicating with a combustion chamber of the engine. However, air may be delivered in admixture with other gases which may enhance or promote combustion, for example hydrogen.

Preferably, the commencement of opening of the air injector, or SOA, is also to be established in terms of a particular crank angle. In this manner, any error implicit in calculating SOA in the time domain may be reduced or eliminated. However, SOA may, if desired, be calculated in the time domain.

In this latter regard, conveniently SOA may be established by subtraction of a required duration of opening of the air injector from EOA. That is, once EOA has been scheduled in the crank domain, time increments corresponding to the known required time delay for which the air injector is to be held open may be subtracted from this EOA setting hence providing a SOA setting in the time domain. Alternatively, SOA may be provided by look-up maps programmed with appropriate SOA settings for specific engine operating conditions as defined, for example, by different engine speed and/or load conditions.

Conveniently, ignition is conveniently scheduled in the crank angle domain where EOA is scheduled in that domain.

Conveniently, the commencement of opening of the delivery injector (SOA) is scheduled subsequent to or simultaneously with the scheduling of the end of the duration of opening of the delivery injector (EOA).

The EOA and ignition time settings may be changed, for example, midway through an injection event. For example, if the detected engine speed has dropped, look-up map values may indicate a more appropriate set of timings or settings. Due primarily to a level of fuel hang-up in the fuel system, an increase or a decrease in the duration of the delivery or injection event will typically result in a corresponding increase or decrease in the quantity of fuel delivered.

The establishment of the end of the duration of opening of the air injector, or EOA, in the crank angle domain may occur under both idle or off-idle operating conditions. However, if desired, this method of establishing the EOA may be utilised under one such set of operating conditions whilst a different method for establishing the EOA may be utilised for the other set of operating conditions. In this regard, the relationship between EOA and ignition is of special importance under idle operating conditions where ignition is required to be closely related to EOA.

Hence, in one embodiment of the method of the invention, EOA may particularly be established in the crank angle domain under idle conditions. Under off-idle conditions where the relationship between EOA and ignition may be less critical, the engine control means, which may be in the form of an electronic control unit (ECU), may revert to establishment of EOA in the time domain following establishment of SOA in the crank angle domain in the manner previously described. For example, at high engine speeds it may be preferred to schedule EOA and ignition in the time domain because crank domain scheduling may pose difficulties under such circumstances. Such difficulties may arise due to a fall in accuracy or other encoder processing limitations.

Preferably, at idle and low engine speeds, EOA, and advantageously ignition, is scheduled in the crank domain whilst at high engine speeds, EOA is scheduled in the time domain.

Preferably, at idle and low engine loads, EOA, and advantageously ignition, is scheduled in the crank domain whilst at high engine loads, EOA is scheduled in the time domain.

Equally, all or some of the remaining events SOF, EOF, SOA and ignition may occur in the crank domain at low or idle speeds while some or all may be scheduled in the time domain at higher engine speeds.

Conveniently, SOA for just off-idle conditions is matched with SOA calculated at idle as any discontinuity between idle and just off-idle conditions may cause engine instability and possible stalling. Accordingly, look-up maps may be provided which smooth the transition between SOA at idle and SOA under off-idle conditions through use of a transition routine advantageously programmed in the engine control means.

Establishment of appropriate crank angles or timings, whether for SOA, EOA, both, or ignition, may suitably be achieved by utilisation of an encoder, the use of which is well established in the art of control of engines. A multi-tooth encoder enables sampling of engine position and/or speed allowing for average speed data to be employed as a basis for SOA/EOA calculation rather than raw speed measured, say at intervals of 60° of crank rotation. However, either average or raw speed data may be utilised for the SOA/EOA calculation. Preferably, raw speed data is used at idle whilst average speed data is used off-idle.

In a further aspect, the invention provides an engine control system for controlling the introduction of a fuel/gas mixture to a combustion chamber of an internal combustion engine by an injection means including a delivery injector comprising an engine control means programmed to establish, under certain engine operating conditions, the end of the duration of opening (EOA) of a delivery or air injector as a crank angle.

The engine control means may be programmed to also establish the commencement of opening of the delivery or air injector, or SOA, as a crank angle.

Conveniently, the commencement of opening of the air injector (SOA) is established subsequent to or simultaneously with the establishment of the end of the duration of opening of the air injector (EOA).

The establishment of EOA in the crank angle domain may occur under both idle or off-idle operating conditions and the engine control means, which may be an electronic control unit (ECU), may be established accordingly. However, if desired, this method for establishing EOA in the crank angle domain may be utilised under one set of engine operating conditions whilst a different method for establishing EOA may be utilised for another set of engine operating conditions as discussed above. For example, the electronic control unit may be programmed such that EOA is established in the crank angle domain under idle conditions and as a time related setting under off-idle conditions.

The engine control system may employ an encoder to provide speed and position data on the basis of which EOA may be established as a crank angle or time related setting, whichever is desired.

Application of the method and system of the invention can help maintain stability of engine operation at low speed even under no load idle conditions. This is particularly so in regard to low inertia engines wherein the speed changes between firing events are typically more pronounced at idle. Further, whilst this speed discrepancy may not be that great between firing events on a higher inertia engine, similar advantages may be evident during driver demanded speed changes (i.e acceleration and deceleration).

It has been found that in certain engines, use of the method and system of the invention wherein both EOA and ignition are set in the crank domain has enabled relatively low idle speeds which previously could not be achieved to become possible. For example, it has been found that an engine which previously had a minimum stable idle at around 600 rpm is now able to hold a stable idle at around 300–350 rpm. It is evident that flow-on benefits of such low idle speeds can ensue and would include better fuel consumption and better NVH characteristics.

The present invention may be more clearly understood from the following description of a preferred embodiment thereof made with reference to the accompanying drawings in which.

Figure 1:
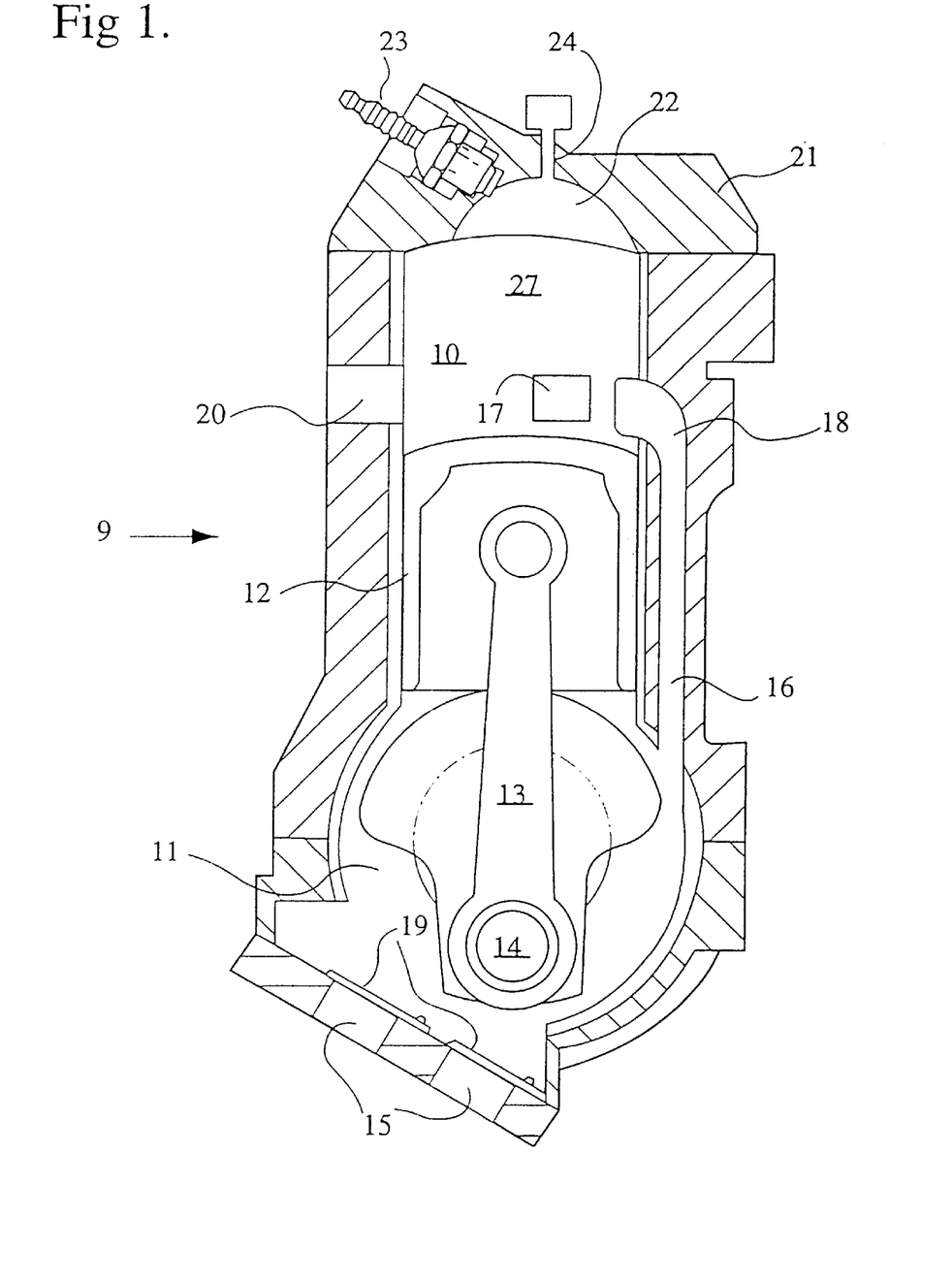
FIG. 1 is a sectional view of one cylinder of a two stroke cycle engine in which the control method of the invention is applicable.

Referring now to FIG. 1, the engine 9 is a two stroke cycle engine, of generally conventional construction, having a cylinder 10, crankcase 11 and piston 12 that reciprocates in the cylinder 10. The piston 12 is coupled by a connecting rod 13 to the crankshaft 14. The crankcase 11 is provided with air induction ports 15, incorporating conventional reed valves 19, and transfer passages 16 (only one shown) communicate the crankcase 11 with respective transfer ports, two of which are shown at 17 and 18.

The transfer ports 17 and 18 are each formed in the wall of the cylinder with their respective upper edge located in the same diametral plane of the cylinder 10. An exhaust port 20 is formed in the wall of the cylinder 10 generally opposite the transfer port 18. The upper edge of the exhaust port 20 is slightly above the diametral plane of the transfer port's 17, 18 upper edges, and will accordingly close later in the respective cylinder combustion cycle.

The detachable cylinder head 21 has a combustion cavity 22 into which a spark plug 23 and delivery injector nozzle 24 project. The cavity 22 is such as to promote stratification as disclosed in the applicant's U.S. Pat. No. 4,719,880, the contents of which are hereby incorporated by reference, and details of its construction may be obtained therefrom. However, a cavity of this type is not essential and other configurations of the cylinder head 21 are comprehended by the present disclosure.

Figure 2:
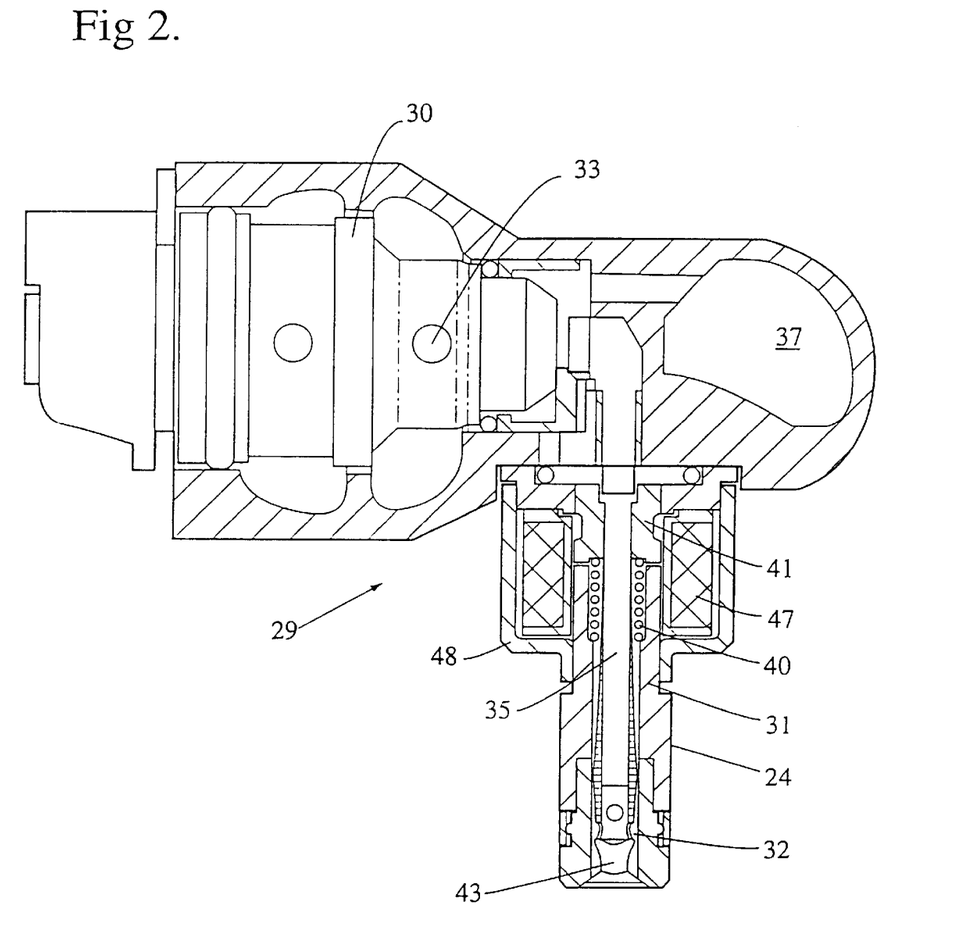
FIG. 2 is an elevational view partly in section of a fuel injection system for use in the delivery of fuel to the engine shown in FIG. 1.

The injector nozzle 24 is an integral part of a fuel injection system 29 whereby fuel entrained in air is delivered to the combustion chamber 27 of the engine 9 by the pressure of the air supply. One embodiment of such a fuel injection system 29 is illustrated in FIG. 2 of the drawings.

The fuel injection system 29 incorporates a suitable commercially available fuel metering device 30 which may be a fuel metering injector, such as an automotive type throttle body injector coupled to a delivery or air injector 31 having a holding chamber 32 therein. Fuel is typically drawn from a fuel reservoir by a fuel pump via a pressure regulator and delivered through fuel inlet port 33 to the fuel metering device 30. The metering device 30, operating in known manner, meters an amount of fuel into the holding chamber 32 via a hollow valve stem 35 of the injector 31 in accordance with the engine fuel demand. Excess fuel supplied to the fuel metering device 30 is returned to the fuel reservoir. It is to be noted that the particular construction of the fuel metering device 30 is not critical to the present invention and any suitable device may be used including positive displacement metering devices as mentioned hereinbefore.

In operation, the holding chamber 32 is pressurised by air supplied from an air source such as a compressor, via a pressure regulator and through an air conduit 37. Delivery valve 43 is actuated to permit the pressurised air to discharge the metered amount of fuel through injector nozzle 24 into the combustion chamber 27 of the engine 9. Delivery valve 43 is of the poppet valve construction opening inwardly to the combustion chamber 27, that is, outwardly from the holding chamber 32.

The delivery valve 43 is coupled, via the hollow valve stem 35 which passes through the holding chamber 32, to an armature 41 of a solenoid assembly 47 located within a housing 48 of the air injector 31. The valve 43 is biased to the closed position by the spring 40 and is opened by energising the solenoid assembly 47. Further details of the injection system 29 may be obtained by way of reference to the applicant's U.S. Pat. No. 4,934,329, the contents of which are incorporated herein by reference.

It will be recalled that the valve 43 is the delivery valve, and hence, its opening time accords with SOA and its closing time accords with EOA. Similarly, the fuel metering device 30 has an opening time which accords with SOF and a closing time which accords with EOF.

Both opening and closing of the fuel and delivery injectors 30 and 31 is dictated by the energisation of solenoids in relation to the engine cycle by a suitable electronic control means or processor. The processor receives an input signal from a speed sensor which may take the form of an encoder. Suitable encoders are well known in the art and an example is disclosed in U.S. Pat. No. 4,941,445 assigned to Motorola Inc.

The encoder provides engine speed data and, through appropriate signal processing, data about the angular position of the crankshaft 14 and hence components of the engine 9. Average or raw speed data may be used by the electronic processor but better performance may be gained through use of data averaged over a short period of time. In this regard, it may be preferred to employ raw speed data at idle and average speed data off-idle.

Determination of the average or raw speed is utilised to determine an appropriate crank angle for the closing of the delivery injector 31 (EOA). EOA is typically established by reference to a look-up map provided with various values of EOA in relation to engine speed. If desired, the look-up map may be subject to other engine operating conditions, such as engine load.

Figure 3:
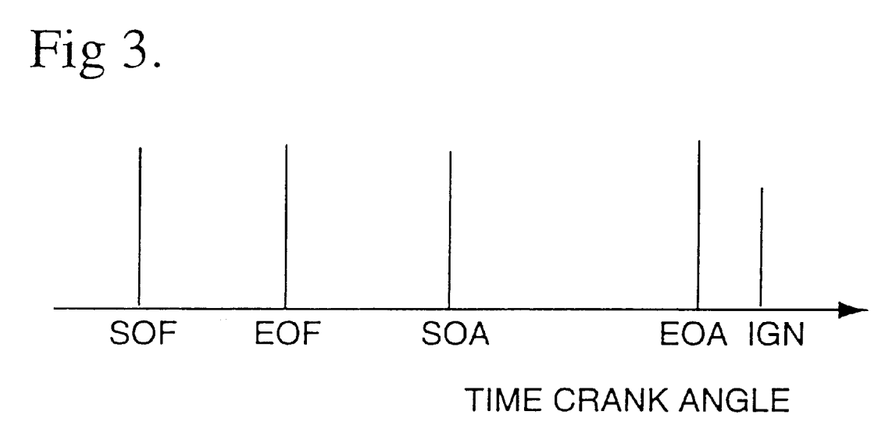
FIG. 3 is a graph of the various events occurring in a typical engine operating cycle.

If desired, the opening time of the delivery injector 31 (SOA) and opening and closing times of the fuel metering injector 30 may be provided by the same look-up map and the value may be in terms of crank angle or time. However, the SOA value or SOF and EOF values for a particular engine operating condition or set of engine operating conditions could be provided by a different look-up map if desired. Ignition time may equally be set by the electronic processor. A diagram showing the typical operating sequence of these events in one embodiment is shown in FIG. 3.

The processor provides appropriate signals to the delivery injector 31, solenoid actuator 47, fuel metering device 30 and spark plug 23 in accordance with the determinations, whether in the crank angle or time domain, of the opening and closing times of the various injectors 30, 31 and activation time of the spark plug 23 at the required time for ignition. The general construction of suitable speed sensors discussed above and load or demand indicators are well known in the industry, as are processors for performing the engine control functions.

Without wishing to be bound by any particular methodology, SOA, SOF, EOA and EOF events may be readily determined either in the crank angle or time domain. For example, once EOA is established, in the crank angle domain, SOA may be set in the time domain by the processor at a time prior to EOA by a duration equal to the time the delivery injector 31 is required to remain open.

The required pulse width for the fuel metering injector 30 and the desired fuel-air delay (FAD) time may then be subtracted from SOA to obtain SOF and EOF values in the time domain. Such subtraction is not required to be performed in real time, indeed it may be desired to avoid this to reduce processing delays. The look-up maps may therefore be preset for this purpose or adaptive in accordance with sensed engine speed and/or load.

It is not intended that time or crank angle domain values be assigned to all of the events in the engine operating cycle. Equally, whether a time or crank angle domain value is assigned to the events may itself depend upon engine operating conditions.

Generally, it may be desirable to set all values in the crank angle domain when the engine 9 is operating at low or idle speed. It is in this speed regime that the relationship between EOA and ignition is most critical and EOA and ignition, at least, may desirably be set in the crank angle domain in accordance with the present invention. The other events may have values set in either the time or crank angle domain though the latter may be preferred for reasons of accuracy. In these cases, engine stability may be maintained even at low speed.

As engine speed increases, SOA typically occurs progressively earlier in the cylinder combustion cycle and the relationship between EOA and ignition to which reference has previously been made may become of lesser importance. Here, the electronic processor may revert to setting SOA in the crank angle domain and EOA may be set as a time interval therefrom in the time domain. Ignition may likewise be set in the time domain.

It is desirable to avoid instability on transition between idle and just off-idle conditions. Thus, a transition routine may be operated to smooth transition between SOA at idle and SOA under off-idle conditions. Appropriate look-up maps may be provided.

It is not intended that the invention be limited in its application to the engine configuration described above where a fuel metering injector 30 is employed. The accurate setting of EOA is equally important in other types of engine, as described for example in published Australian Patent Application No. 65608/94. In that application, a positive displacement fuel metering pump is utilised rather than a solenoid actuated injector. However, operation of the pump is still required to be controlled to achieve delivery of a required metered quantity of fuel to a delivery injector.

The invention is also not limited in its scope to two stroke cycle engines and may be applied to four stroke cycle engines. In either event, the engine may be of single or multi-cylinder type. The invention is equally applicable to certain engines having single fluid injection systems and those engines which are spark ignited.

What is claimed is:

1. An internal combustion engine comprising a direct injection system and an electronic engine control means for controlling ignition means and at least one electronically controlled fuel delivery means wherein, at least under certain engine operating conditions, the end of the duration of opening of the delivery means and the timing of ignition are scheduled by the engine control means according to prevailing engine operating conditions so that each occurs respectively at a pre-determined crank angle, whereby, in operation, the relationship between the end of the opening duration and ignition is relatively insensitive to engine speed transients.

2. The engine of claim 1 wherein said crank angle for the end of the duration of the opening of the delivery means and the crank angle for ignition have a pre-determined relationship.

3. The engine of claim 1 wherein said method is an idle control strategy.

4. The engine of claim 1 wherein said engine is a low inertia engine.

5. The engine of claim 1 wherein the start of the duration of opening of the delivery means is scheduled by the engine control means as a function of the crank angle scheduled for the end of the duration of opening of the delivery means.

6. The engine of claim 5 wherein said start of the opening duration of the delivery means is scheduled in the time domain according to a pre-determined duration.

7. The engine of claim 5 wherein the start of opening of the duration of said delivery means is scheduled as a crank angle.

8. The engine of claim 6 wherein the start of opening of the duration of said delivery means is scheduled as a crank angle.

9. The engine of claim 1 wherein the start of the opening duration of the delivery means is scheduled as a crank angle.

10. The engine of claim 1 wherein the end of the opening duration of the delivery means is scheduled by the engine control means as a function of the start of the opening duration of said delivery means.

11. The engine of claim 10 wherein said start of the opening duration of the delivery means is scheduled in the time domain according to a predetermined duration.

12. The engine of claim 10 wherein the end of the opening duration of the delivery means is scheduled as a crank angle.

13. The engine of claim 1 wherein said direct injection system is a dual fluid fuel injection system whereby said delivery means is adapted to deliver a fuel/gas mixture and wherein the start of the opening duration of the delivery means is the start of a fuel/gas mixture delivery period of said delivery means and the end of the opening duration of said delivery means is the end of fuel/gas mixture delivery period of said delivery means.

14. The engine according to claim 13 wherein fuel is metered to said delivery injector by a fuel metering means.

15. The engine according to claim 1, wherein 1) for low load conditions said end of delivery period of said delivery means is scheduled as a crank angle and said start of delivery period is set as a function of said end of delivery crank angle and 2) for high load conditions said start of delivery period of said delivery means is set as a crank angle and said end of delivery period is set as a function of said start of delivery crank angle.

16. The engine according to claim 5, wherein 1) for low load conditions said end of delivery period of said delivery means is scheduled as a crank angle and said start of delivery period is set as a function of said end of delivery crank angle and 2) for high load conditions said start of delivery period of said delivery means is set as a crank angle and said end of delivery period is set as a function of said start of delivery crank angle.

17. The engine according to claim 13, wherein 1) for low load conditions said end of delivery period of said delivery means is scheduled as a crank angle and said start of delivery period is set as a function of said end of delivery crank angle and 2) for high load conditions said start of delivery period of said delivery means is set as a crank angle and said end of delivery period is set as a function of said start of delivery crank angle.

18. An engine control system for operating an internal combustion engine comprising a direct injection system; said system comprising an electronic engine control means for controlling ignition means and at least one electronically controlled fuel delivery means wherein, at least under certain engine operating conditions the end of the duration of opening of the delivery means and the timing of ignition are scheduled by the engine control means according to prevailing engine operating conditions so that each occurs respectively at a pre-determined crank angle, whereby, in operation, the relationship between the end of the opening duration and ignition is relatively insensitive to engine speed transients.

19. The engine control system of claim 18 wherein said crank angle for the end of the duration of the opening of the delivery means and the crank angle for ignition have a pre-determined relationship.

20. The engine control system of claim 18 wherein said engine control means provides an idle control strategy.

21. The engine control system of claim 18 wherein said engine is a low inertia engine.

22. The engine control system of claim 18 wherein the start of the duration of opening of the delivery means is scheduled by the engine control means as a function of the crank angle scheduled for the end of the duration of opening of the delivery means.

23. The engine control system of claim 22 wherein said start of the opening duration of the delivery means is scheduled in the time domain according to a pre-determined duration.

24. The engine control system of claim 22 wherein the start of opening of the duration of said delivery means is scheduled as a crank angle.

25. The engine control system of claim 23 wherein the start of opening of the duration of said delivery means is scheduled as a crank angle.

26. The engine control system of claim 18 wherein the start of the opening duration of the delivery means is scheduled as a crank angle.

27. The engine control system of claim 18 wherein the end of the opening duration of the delivery means is set as a function of the start of the opening duration of said delivery means.

28. The engine control system of claim 27 wherein said start of the opening duration of the delivery means is scheduled in the time domain according to a predetermined duration.

29. The engine control system of claim 27 wherein the end of the opening duration of the delivery means is scheduled as a crank angle.

30. The engine control system of claim 18 wherein said direct injection fuel system is a dual fluid fuel injection system whereby said delivery means is adapted to deliver a fuel/gas mixture and wherein the start of the opening duration of the delivery means is the start of a fuel/gas mixture delivery period of said delivery means and the end of the opening duration of said delivery means is the end of fuel/gas mixture delivery period of said delivery means.

31. The engine control system according to claim 18 wherein 1) for low load conditions said end of delivery period of said delivery means is scheduled as a crank angle and said start of delivery period is set as a function of said end of delivery crank angle and 2) for high load conditions said start of delivery period of said delivery means is set as a crank angle and said end of delivery period is set as a function of said start of delivery crank angle.

32. The engine control system according to claim 31 wherein fuel is metered to said delivery injector by a fuel metering means.

33. An internal combustion engine having an electronic engine control means and a fuel injection system for delivering a fuel/gas mixture to at least one combustion chamber of said engine; said fuel injection system comprising at least one delivery injector wherein, under certain engine operating conditions, the end of the duration of opening of the delivery injector is scheduled by the engine control means to be at a particular crank angle and the start of the duration of opening of the delivery injector is scheduled in the time domain by said engine control means as a function of said crank angle of said end of duration of opening of the delivery injector.

34. The engine of claim 33 wherein said function is a predetermined duration.

35. The engine of claim 33 wherein said engine control means is adapted to schedule said start of duration of opening of the delivery injector as a crank angle corresponding with said time domain scheduling.

36. The engine of claim 33 wherein fuel is metered to said delivery injector by a fuel metering means.

37. The engine of claim 33 wherein the delivery injector is a gas injector, wherein fuel is metered to the gas injector by a fuel metering means whereby said fuel entrained in a gas is delivered by said delivery injection to a combustion chamber, and a variable associated with the end of the opening duration of the gas injector (EOA) is scheduled at a particular crank angle.

38. The engine of claim 37 wherein a variable associated with the commencement of opening of the gas injector (SOA) is established in the time domain as a function of the crank angle scheduled for EOA.

39. The engine of claim 38 wherein the SOA is established subsequent to or simultaneously with establishment of EOA.

40. The engine of claim 37 wherein said engine further comprises ignition means for ignition of fuel delivered to said engine and wherein EOA and ignition time settings are scheduled during an injection event.

41. The engine of claim 40 wherein EOA or a variable associated with the commencement of opening of the gas injector (SOA) are re-scheduled in response to a change in detected engine speed.

42. The engine of claim 37 wherein EOA is established in the crank angle domain under idle operating conditions.

43. The engine of claim 34 wherein a variable associated with the end of the opening of the gas injector (EOA) is established in the time domain under off-idle operating conditions.

44. The engine of claim 43 wherein EOA is established in the time domain under off-idle conditions following establishment of the commencement of opening of the gas injector (SOA) in the crank angle domain.

45. The engine of claim 37 wherein EOA is calculated in the crank domain under idle and low engine speed conditions.

46. The engine of claim 45 wherein EOA is calculated in the time domain at high engine speeds.

47. The engine of claim 38 wherein SOA is established by subtraction of a duration of opening of the delivery injector from EOA.

48. The engine of claim 38 wherein a variable associated with the commencement of opening of the gas injector (SOA) is obtained from look-up maps programmed with SOA values for a specific engine operating condition.

49. The engine of claim 48 wherein the engine operating condition is at least one of engine speed and engine load.

50. The engine of claim 37 wherein a variable associated with the commencement of opening of the gas injector (SOA) for just off-idle conditions is matched with SOA under idle conditions.

51. The engine of claim 38 wherein the transition between SOA at idle and SOA under off-idle conditions is controlled by a transition routine.

52. The engine of claim 38 wherein average speed data is utilised for SOA/EOA calculation.

53. The engine of claim 38 wherein raw speed data is utilised for SOA/EOA calculation.

54. The engine of claim 38 wherein under other operating conditions EOA is established by the engine control means in the time domain.

55. The engine of claim 33 wherein the fuel metering means is a fuel metering injector, the opening of which is set in the crank domain.

56. The engine of claim 33 wherein the fuel metering means is a fuel metering injector, the closing of which is set in the crank domain.

57. The engine of claim 33 wherein the fuel metering means is a fuel metering injector, the opening of which is set in the time domain.

58. The engine of claim 33 wherein the fuel metering means is a fuel metering injector, the closing of which is set in the time domain.

59. The engine of claim 55 wherein the opening of the fuel metering injector or the closing of the fuel metering injector are set in the crank domain under low or idle conditions.

60. The engine of claim 57 wherein the opening of the fuel metering injector or the closing of the fuel metering injector are set in the time domain under high or off-idle conditions.

61. The engine of claim 34 wherein said engine control means is adapted to schedule said start of duration of opening of the delivery injector as a crank angle corresponding with said time domain scheduling.

62. An engine control system for controlling an internal combustion engine having a fuel injection system for delivering a fuel/gas mixture directly to at least one combustion chamber of said engine and comprising at least one delivery injector; said engine control system comprising an electronic engine control means programmed to schedule, under certain engine operating conditions, the end of the duration of opening of the delivery injector as a crank angle and to schedule the start of the duration of opening of the delivery injector in the time domain as a function of said crank angle of said end of duration of opening of the delivery injector.

63. The system of claim 62 including a fuel metering means for metering fuel to said delivery injector.

64. The system of claim 62 wherein said engine control means is programmed with timings of a variable associated with the end of the duration of opening of the delivery injector (EOA) and ignition timings in accordance with engine operating conditions.

65. The system of claim 63 wherein said engine control means is programmed with timings of a variable associated with the end of the duration of opening of the delivery injector (EOA) and ignition timings in accordance with engine operating conditions.

66. The system of claim 62 including an encoder for providing at least one of speed and position data for the engine control means for determination of a variable associated with the end of the duration of opening of the delivery injector (EOA).

67. The system of claim 62 wherein the engine control means is programmed with timings of a variable associated with the commencement of opening of the delivery injector (SOA) for a specific engine operating condition.

68. The system of claim 62 wherein the engine control means is programmed to establish a variable associated with the end of the duration of opening of the delivery injector (EOA) in the crank angle domain under idle conditions.

69. The system of claim 62 wherein the engine control means is programmed to establish a variable associated with the end of the duration of opening of the delivery injector (EOA) in the time domain under high or off-idle conditions.

70. The system of claim 62 wherein said metering means is a metering injector, variables SOF and EOF being programmed in the time domain where SOF is a variable associated with the commencement of the opening of the metering injector and where EOF is a variable associated with the end of the duration of opening of the metering injector.

71. The system of claim 63 wherein said metering means is a metering injector, variables SOF and EOF being programmed in the crank angle domain where SOF is a variable associated with the commencement of the opening of the metering injector and where EOF is a variable associated with the end of the duration of opening of the metering injector.

72. The system of claim 70 wherein at least one of SOF and EOF are programmed in the crank angle domain under low load or idle conditions.

73. The system of claim 71 wherein at least one of SOF and EOF are programmed in the crank angle domain under low load or idle conditions.

74. The system of claim 62 wherein said engine is a spark ignited engine.

75. The system of claim 74 wherein ignition is scheduled in the crank angle domain.

76. The system of claim 62 wherein said function is a predetermined duration.

77. The system of claim 76 wherein said engine control means is adapted to schedule said start of duration of opening of the delivery injector as a crank angle corresponding with said time domain scheduling.

78. A method of controlling the introduction of fuel to a combustion chamber of an internal combustion engine by an injection system including a delivery means the method comprising: at least under certain engine operating conditions, (a) calculating a first crank angle for an end of the duration of opening of the delivery means; (b) calculating a second crank angle for ignition; (c) calculating a start of the duration of opening of the delivery means in the time domain as a function of the first crank angle, and (d) controlling the engine in response to the calculating steps (a)–(c).

79. The method of claim 78 wherein the start of duration of opening of the delivery means is scheduled as a crank angle corresponding with said time domain scheduling.

80. A method of controlling the introduction of a fuel/gas mixture to a combustion chamber of an internal combustion engine by an injection means including a delivery injector, the method comprising: at least under certain engine operating conditions, (a) calculating a first crank angle for an end of the duration of opening of the delivery injector, (b) calculating a start of the duration of opening of the delivery injector as a function of the first crank angle, and (c) controlling the engine in response to the calculating steps (a) and (b) wherein the start of duration of opening of the delivery injector is calculated in the time domain.

81. The method of claim 80, wherein the start of duration of opening of the delivery injector is scheduled as a crank angle corresponding with said time domain scheduling.

82. An engine control system for controlling the introduction of a fuel/gas mixture to a combustion chamber of an internal combustion engine by an injection means comprising: a delivery injector including an engine control means for establishing, under certain engine operating conditions, a first crank angle for an end of the duration of opening of the delivery injector, for establishing a start of duration of opening of the delivery injector as a function of the first crank angle, and for controlling the engine based upon the established first crank angle and start of duration of opening of the delivery injector, wherein the start of duration of opening of the delivery injector is established in the time domain.

83. The system of claim 82 wherein the start of duration of opening of the delivery injector is established as a crank angle.

84. An engine control system for controlling the introduction of a fuel/gas mixture to a combustion chamber of an internal combustion engine by an injection system comprising: a delivery injector and an engine controller, programmed to establish, under certain engine operating conditions, a first crank angle for an end of the duration of opening of the delivery injector, and a start of duration of opening of the delivery injector as a function of the first crank angle, said engine controller programmed to control the engine based upon the established first crank angle and start of duration of opening of the delivery injector, wherein the start of duration of opening of the delivery injector is established in the time domain.

85. The system of claim 84 wherein the start of duration of opening of the delivery injector is scheduled as a crank angle corresponding with said time domain scheduling.

86. An internal combustion engine comprising a direct injection system and an electronic engine control means for controlling ignition means and at least one electronically controlled fuel delivery means wherein, at least under certain engine operating conditions, the end of the duration of opening of the delivery means and the timing of ignition are scheduled by the engine control means according to prevailing engine operating conditions so that each occurs respectively at a pre-determined crank angle, whereby, in operation, the relationship between the end of the opening duration and ignition is relatively insensitive to engine speed transients, wherein the start of the duration of opening of the delivery means is scheduled by the engine control means as a function of the crank angle scheduled for the end of duration of opening of the delivery means.

87. The engine of claim 86 wherein said engine control is an idle control system.

88. The engine of claim 86 wherein said engine is a low inertia engine.

89. An internal combustion engine comprising a direct injection system and an electronic engine control means for controlling ignition means and at least one electronically controlled fuel delivery means wherein, at least under certain engine operating conditions, the end of the duration of opening of the delivery means and the timing of ignition are scheduled by the engine control means according to prevailing engine operating conditions so that each occurs respectively at a pre-determined crank angle, whereby, in operation, the relationship between the end of the opening duration and ignition is relatively insensitive to engine speed transients, wherein said start of the opening duration of the delivery means is scheduled in the time domain according to a pre-determined duration.

90. The engine of claim 89 wherein said engine control is an idle control system.

91. The engine of claim 89 wherein said engine is a low inertia engine.

92. An internal combustion engine comprising a direct injection system and an electronic engine control means for controlling ignition means and at least one electronically controlled fuel delivery means wherein, at least under certain engine operating conditions, the end of the duration of opening of the delivery means and the timing of ignition are scheduled by the engine control means according to prevailing engine operating conditions so that each occurs respectively at a pre-determined crank angle, whereby, in operation, the relationship between the end of the opening duration and ignition is relatively insensitive to engine speed transients, wherein said direct injection system is a dual fluid fuel injection system whereby said delivery means is adapted to deliver a fuel/gas mixture and wherein the start of the opening duration of the delivery means is the start of a fuel/gas mixture delivery period of said delivery means and the end of the opening duration of said delivery means is the end of fuel/gas mixture delivery period of said delivery means.

93. The engine of claim 92 wherein said engine control is an idle control system.

94. The engine of claim 92 wherein said engine is a low inertia engine.

95. The engine of claim 92 wherein the start of the duration of opening of the delivery means is scheduled by the engine control means as a function of the crank angle scheduled for the end of duration of opening of the delivery means.

96. The engine of claim 92 wherein said start of the opening duration of the delivery means is scheduled in the time domain according to a pre-determined duration.

97. An engine control system for operating an internal combustion engine comprising a direct injection system, said system comprising an electronic engine control means for controlling ignition means and at least one electronically controlled fuel delivery means wherein, at least under certain engine operating conditions, the end of the duration of opening of the delivery means and the timing of ignition are scheduled by the engine control means according to prevailing engine operating conditions so that each occurs respectively at a pre-determined crank angle, whereby, in operation, the relationship between the end of the opening duration and ignition is relatively insensitive to engine speed transients, wherein the start of the duration of opening of the delivery means is scheduled by the engine control means as a function of the crank angle scheduled for the end of duration of opening of the delivery means.

98. The engine control system of claim 97 wherein said engine control system is an idle control system.

99. The engine control system of claim 97 wherein said engine is a low inertia engine.

100. An engine control system for operating an internal combustion engine comprising a direct injection system and an electronic engine control means for controlling ignition means and at least one electronically controlled fuel delivery means wherein, at least under certain engine operating conditions, the end of the duration of opening of the delivery means and the timing of ignition are scheduled by the engine control means according to prevailing engine operating conditions so that each occurs respectively at a pre-determined crank angle, whereby, in operation, the relationship between the end of the opening duration and ignition is relatively insensitive to engine speed transients, wherein said start of the opening duration of the delivery means is scheduled in the time domain according to a pre-determined duration.

101. The engine control system of claim 100 wherein said engine control system is an idle control system.

102. The engine control system of claim 100 wherein said engine is a low inertia engine.

103. An engine control system for operating an internal combustion engine comprising a direct injection system and an electronic engine control means for controlling ignition means and at least one electronically controlled fuel delivery means wherein, at least under certain engine operating conditions, the end of the duration of opening of the delivery means and the timing of ignition are scheduled by the engine control means according to prevailing engine operating conditions so that each occurs respectively at a pre-determined crank angle, whereby, in operation, the relationship between the end of the opening duration and ignition is relatively insensitive to engine speed transients, wherein said direct injection system is a dual fluid fuel injection system whereby said delivery means is adapted to deliver a fuel/gas mixture and wherein the start of the opening duration of the delivery means is the start of a fuel/gas mixture delivery period of said delivery means and the end of the opening duration of said delivery means is the end of fuel/gas mixture delivery period of said delivery means.

104. The engine control system of claim 103 wherein said engine control system is an idle control system.

105. The engine control system of claim 103 wherein said engine is a low inertia engine.

106. The engine control system of claim 103 wherein the start of the duration of opening of the delivery means is scheduled by the engine control means as a function of the crank angle scheduled for the end of duration of opening of the delivery means.

107. The engine control system of claim 103 wherein said start of the opening duration of the delivery means is scheduled in the time domain according to a pre-determined duration.

108. An internal combustion engine having an electronic engine control means and a fuel injection system for delivering a fuel/gas mixture to at least one combustion chamber of said engine; said fuel injection system comprising at least one delivery injector wherein, under certain engine operating conditions, the end of the duration of opening of the delivery injector is scheduled by the engine control means to be at a particular crank angle and the start of the duration of opening of the delivery injector is scheduled in the time domain by said engine control means as a function of said crank angle of said end of duration of opening of the delivery injector, wherein the delivery injector is a gas injector, wherein fuel is metered to the gas injector by a fuel metering means whereby said fuel entrained in a gas is delivered by said delivery injector to a combustion chamber, and EOA is scheduled at particular crank angle where EOA is a variable associated with the end of the opening duration of the gas injector.

109. The engine of claim 108 wherein said function is a predetermined duration.

110. The engine of claim 108 wherein said engine control means is adapted to schedule said start of duration of opening of the delivery injector as a crank angle corresponding with said time domain scheduling.

111. The engine of claim 108 wherein the fuel metering means is a fuel metering injector, the opening of which is set in the crank domain.

112. The engine of claim 108 wherein the fuel metering means is a fuel metering injector, the closing of which is set in the crank position.

113. The engine of claim 108 wherein the fuel metering means is a fuel metering injector, the opening of which is set in the time domain.

114. The engine of claim 108 wherein the fuel metering means is a fuel metering injector, the closing of which is set in the time domain.

115. The engine of claim 108 wherein the opening of the fuel metering injector or the closing of the fuel metering injector are set in the crank domain under low or idle conditions.

116. The engine of claim 113, wherein the opening of the fuel metering injector or closing of the fuel metering injector are set in the time domain under high or off-idle conditions.

117. The engine of claim 111 wherein said function is a predetermined duration.

118. The engine of claim 112 wherein said function is a predetermined duration.

119. The engine of claim 113 wherein said function is a predetermined duration.

120. The engine of claim 114 wherein said function is a predetermined duration.

121. The engine of claim 115 wherein said function is a predetermined duration.

122. The engine of claim 116 wherein said function is a predetermined duration.

123. The engine of claim 111 wherein said engine control means is adapted to schedule said start of duration of opening of the delivery injector as a crank angle corresponding with said time domain scheduling.

124. The engine of claim 112 wherein said engine control means is adapted to schedule said start of duration of opening of the delivery injector as a crank angle corresponding with said time domain scheduling.

125. The engine of claim 113 wherein said engine control means is adapted to schedule said start of duration of opening of the delivery injector as a crank angle corresponding with said time domain scheduling.

126. The engine of claim 114 wherein said engine control means is adapted to schedule said start of duration of opening of the delivery injector as a crank angle corresponding with said time domain scheduling.

127. The engine of claim 115 wherein said engine control means is adapted to schedule said start of duration of opening of the delivery injector as a crank angle corresponding with said time domain scheduling.

128. The engine of claim 116 wherein said engine control means is adapted to schedule said start of duration of opening of the delivery injector as a crank angle corresponding with said time domain scheduling.

129. The engine of claim 111 wherein SOA is established in the time domain as a function of the crank angle scheduled for EOA where SOA is a variable associated with the commencement of opening of the gas injector.

130. The engine of claim 112 wherein SOA is established in the time domain as a function of the crank angle scheduled for EOA where SOA is a variable associated with the commencement of opening of the gas injector.

131. The engine of claim 113 wherein SOA is established in the time domain as a function of the crank angle scheduled for EOA where SOA is a variable associated with the commencement of opening of the gas injector.

132. The engine of claim 114 wherein SOA is established in the time domain as a function of the crank angle scheduled for EOA where SOA is a variable associated with the commencement of opening of the gas injector.

133. The engine of claim 115 wherein SOA is established in the time domain as a function of the crank angle scheduled for EOA where SOA is a variable associated with the commencement of opening of the gas injector.

134. The engine of claim 116 wherein SOA is established in the time domain as a function of the crank angle scheduled for EOA where SOA is a variable associated with the commencement of opening of the gas injector.

135. An internal combustion engine having an electronic engine control means and a fuel injection system for delivering a fuel/gas mixture to at least one combustion chamber of said engine; said fuel injection system comprising at least one delivery injector wherein, under certain engine operating conditions, the end of the duration of opening of the delivery injector is scheduled by the engine control means to be at a particular crank angle and the start of the duration of opening of the delivery injector is scheduled in the time domain by said engine control means as a function of said crank angle of said end of duration of opening of the delivery injector, wherein EOA is established in the time domain under off-idle operating conditions.

136. The engine of claim 135 wherein said function is a predetermined duration.

137. The engine of claim 135 wherein said engine control means is adapted to schedule said start of duration of opening of the delivery injector as a crank angle corresponding with said time domain scheduling.

138. The engine of claim 135 wherein the delivery injector is a gas injector, wherein fuel is metered to the gas injector by a fuel metering means whereby said fuel entrained in a gas is delivered by said delivery injector to a combustion chamber, and EOA is scheduled at particular crank angle where EOA is a variable associated with the end of the opening duration of the gas injector.

139. A method of operating an internal combustion engine comprising a direct injection system and an electronic engine control for controlling ignition means and at least one electronically controlled fuel delivery means, the method comprising: scheduling the end of the duration of opening of the delivery means and the timing of ignition according to prevailing engine operating conditions so that each occurs respectively at a pre-determined crank angle, whereby, in operation, the relationship between the end of the opening duration and ignition is relatively insensitive to engine speed transients.

140. The method of claim 139 wherein said crank angle for the end of the duration of the opening of the delivery means and the crank angle for ignition have a pre-determined relationship.

141. The method of claim 139 wherein said method is an idle control strategy.

142. The method of claim 139 wherein said engine is a low inertia engine.

143. The method of claim 139 further comprising:
scheduling the start of the duration of opening of the delivery means as a function of the crank angle scheduled for the end of the duration of opening of the delivery means.

144. The method of claim 143 wherein said scheduling of the start of the opening duration of the delivery means is scheduled in the time domain according to a pre-determined duration.

145. The method of claim 143 wherein said scheduling of the start of opening of the duration of said delivery means is scheduled as a crank angle.

146. The method of claim 139 wherein said scheduling of the end of the opening duration of the delivery means is a function of the start of the opening duration of said delivery means.

147. The method of claim 146 further comprising scheduling the start of the opening duration of the delivery means in the time domain according to a pre-determined duration.

148. The method of claim 146 wherein said scheduling of the end of the opening duration of the delivery means is scheduled as a crank angle.

149. The method of claim 139 wherein said direct injection system is a dual fluid fuel injection system whereby said delivery means is adapted to deliver a fuel/gas mixture, and further comprising: starting delivery of said fuel/gas mixture to said engine at the start of the opening duration of the delivery means, and ending delivery of said fuel/gas mixture at the end of the opening duration of said delivery means.

150. The method according to claim 149 further comprising:
metering fuel provided to said delivery injector.

151. The method according to claim 143, wherein 1) said scheduling of the end of the duration of opening of said delivery means is scheduled as a crank angle for low load conditions and scheduling of the start of the duration of opening is set as a function of said end of delivery crank angle for low load conditions and 2) said scheduling of the start of the duration of opening of said delivery means is set as a crank angle for high load conditions and said scheduling of the end of the duration of opening is set as a function of said start of delivery crank angle for high load conditions.

152. The method according to claim 149, wherein 1) said scheduling of the end of the duration of opening of said delivery means is scheduled as a crank angle for low load conditions and scheduling of the start of the duration of opening is set as a function of said end of delivery crank angle for low load conditions and 2) said scheduling of the start of the duration of opening of said delivery means is set as a crank angle for high load conditions and said scheduling of the end of the duration of opening is set as a function of said start of delivery crank angle for high load conditions.

153. A method of controlling an internal combustion engine having an electronic engine control means and a fuel injection system for delivering a fuel/gas mixture to at least one combustion chamber of said engine; said fuel injection system comprising at least one delivery injector, said method comprising:
  scheduling the end of the duration of opening of the delivery injector at a particular crank angle, and scheduling the start of the duration of opening of the delivery injector in the time domain as a function of said crank angle of said end of duration of opening of the delivery injector.

154. The method of claim 153 wherein said scheduling of the start of duration of opening of the delivery injector is scheduled as a crank angle corresponding with said time domain scheduling.

155. The method of claim 153 further comprising: metering fuel provided to saiddelivery injector.

156. The method of claim 155 wherein the delivery injector is a gas injector and further comprising:
  entraining said fuel in a gas; delivering said fuel/gas mixture to a combustion chamber;
  and scheduling the end of the opening duration of the gas injector (EOA) at a particular crank angle.

157. The method of claim 156 further comprising: scheduling the commencement of opening of the gas injector (SOA) in the time domain as a function of the crank angle scheduled for EOA.

158. The method of claim 156 wherein said scheduling of EOA is scheduled during an injection event; and further comprising:
  scheduling ignition during an injection event.

159. The method of claim 158 wherein said scheduling of EOA changes in response to a change in detected engine speed; and further comprising:
  changing a scheduling the commencement of opening of the gas injector (SOA) in response to a detected change in engine speed.

160. The method of claim 156 wherein said scheduling of EOA occurs in the crank angle domain under idle operating conditions.

161. The method of claim 156 further comprising:
  scheduling the end of the opening of the gas injector (EOA) in the time domain under off-idle operating conditions.

162. The method of claim 161 wherein said scheduling of the EOA is in the time domain under off-idle conditions following establishment of commencement of the opening of the gas injector (SOA) in the crank angle domain.

163. The method of claim 156 wherein said scheduling of the EOA is in the crank domain under idle and low engine speed conditions.

164. The method of claim 163 wherein said scheduling of the EOA is in the time domain at high engine speeds.

165. The method of claim 157 further comprising: controlling the transition between SOA at idle and SOA under off-idle conditions by a transition routine.

166. The method of claim 156 wherein under other operating conditions EOA is established by the engine control means in the time domain.

167. The method of claim 153 further comprising: scheduling the opening of a fuel metering injector in the crank domain.

168. The method of claim 153 further comprising:
  scheduling the closing of a fuel metering injector in the crank domain.

169. The method of claim 153 further comprising:
  scheduling the opening of a fuel metering injector in the time domain.

170. The method of claim 153 further comprising:
  scheduling the closing of a fuel metering injector in the time domain.

171. The method of claim 167 wherein said scheduling of the opening of the fuel metering injector is in the crank domain under low or idle conditions.

172. The method of claim 169 wherein said scheduling of the opening of the fuel metering injector is in the time domain under high or off-idle conditions.

173. The method of claim 153 wherein said scheduling of the start of duration of opening of the delivery injector is a crank angle corresponding to said time domain scheduling.

174. A method of operating an internal combustion engine comprising a direct injection system and an electronic engine control for controlling ignition means and at least one electronically controlled fuel delivery system, the method comprising: scheduling the end of the duration of opening of the delivery means and the timing of ignition according to prevailing engine operating conditions so that each occurs respectively at a pre-determined crank angle, whereby, in operation, the relationship between the end of the opening duration and ignition is relatively insensitive to engine speed transients, wherein the start of the duration of opening of the delivery means is scheduled by the engine control means as a function of the crank angle scheduled for the end of duration of opening of the delivery means.

175. The method of claim 174 wherein said method is an idle control strategy.

176. A method of operating an internal combustion engine comprising a direct injection system and an electronic engine control means for controlling ignition means and at least one electronically controlled fuel delivery means, the method comprising:
  scheduling the end of the duration of opening of the delivery means and the timing of ignition according to prevailing engine operating conditions so that each occurs respectively at a pre-determined crank angle, whereby, in operation, the relationship between the end of the opening duration and ignition is relatively insensitive to engine speed transients; and
  scheduling the start of the opening duration of the delivery means in the time domain according to a pre-determined duration.

177. The method of claim 176 wherein said method is an idle control strategy.

178. A method of operating an internal combustion engine comprising a direct injection system, said direct injection system is a dual fluid fuel injection system, and an electronic engine control for controlling ignition means and at least one electronically controlled fuel delivery means, said delivery means is adapted to deliver a fuel/gas mixture, said method comprising:

scheduling the end of the duration of opening of the delivery means and the timing of ignition according to prevailing engine operating conditions so that each occurs respectively at a pre-determined crank angle, whereby, in operation, the relationship between the end of the opening duration and ignition is relatively insensitive to engine speed transients, wherein the start of the opening duration of the delivery means is the start of a fuel/gas mixture delivery period of said delivery means and the end of the opening duration of said delivery means is the end of fuel/gas mixture delivery period of said delivery means.

179. The method of claim 178 wherein said method is an idle control strategy.

180. The method of claim 178 further comprising:

scheduling the start of the duration of opening of the delivery means as a function of the crank angle scheduled for the end of duration of opening of the delivery means.

181. The method of claim 178 further comprising:

scheduling of the start of the opening duration of the delivery means in the time domain according to a pre-determined duration.

182. A method of controlling an internal combustion engine having an electronic engine control and a fuel injection system for delivering a fuel/gas mixture to at least one combustion chamber of said engine; said fuel injection system comprising at least one delivery injector, wherein the delivery injector is a gas injector, wherein fuel is metered to the gas injector by a fuel metering means whereby said fuel entrained in a gas is delivered by said delivery injector to a combustion chamber, said method comprising:

scheduling the end of the duration of opening of the delivery injector at a particular crank angle;

scheduling the start of the duration of opening of the gas injector (SOA) in the time domain by said engine control means as a function of said crank angle of said end of duration of opening of the delivery injector; and scheduling the end of the opening duration of the gas injector (EOA) at a particular crank angle.

183. The method of claim 182 wherein said scheduling of the start of duration of opening of the delivery injector is scheduled as a crank angle corresponding with said time domain scheduling.

184. The method of claim 182 further comprising:

opening a fuel metering injector in the crank domain.

185. The method of claim 182 further comprising:

closing a fuel metering injector in the crank domain.

186. The method of claim 182 further comprising:

opening a fuel metering injector in the time domain.

187. The method of claim 182 further comprising:

closing a fuel metering injector in the time domain.

188. The method of claim 182 further comprising:

opening a fuel metering injector in the crank domain under low or idle conditions; and closing the fuel metering injector in the crank domain under low or idle conditions.

189. The method of claim 187, wherein the opening of the fuel metering injector in the time domain occurs under high or off-idle conditions.

190. The method of claim 184 wherein said scheduling of the start of the duration of opening of the delivery injector is a crank angle corresponding with said time domain scheduling.

191. The method of claim 185 wherein said scheduling of the start of the duration of opening of the delivery injector is a crank angle corresponding with said time domain scheduling.

192. The method of claim 186 wherein said scheduling of the start of the duration of opening of the delivery injector is a crank angle corresponding with said time domain scheduling.

193. The method of claim 187 wherein said scheduling of the start of duration of opening of the delivery injector is a crank angle corresponding with said time domain scheduling.

194. The method of claim 188 wherein said scheduling of the start of the duration of opening of the delivery injector is a crank angle corresponding with said time domain scheduling.

195. The method of claim 189 wherein said scheduling of the start of the duration of opening of the delivery injector is a crank angle corresponding with said time domain scheduling.

196. A method of controlling an internal combustion engine having an electronic engine control and a fuel injection system for delivering a fuel/gas mixture to at least one combustion chamber of said engine; said fuel injection system comprising at least one delivery injector, said method comprising:

scheduling the end of the duration of opening of the delivery injector at a particular crank angle under idle operating conditions;

scheduling the start of the duration of opening of the delivery injector in the time domain as a function of said crank angle of said end of duration of opening of the delivery injector; and scheduling the end of the opening of the delivery injector (EOA) in the time domain under off-idle operating conditions.

197. The method of claim 196 wherein said scheduling of the start of duration of opening of the delivery injector is a crank angle corresponding with said time domain scheduling.

198. The method of claim 196 further comprising:

metering the fuel provided to the injector;

entraining said fuel in a gas; and delivering said fuel/gas mixture with said delivery injector to a combustion chamber.

* * * * *